United States Patent
Heemstra et al.

(10) Patent No.: US 11,140,762 B2
(45) Date of Patent: Oct. 5, 2021

(54) METHOD OF SELECTING A CONTROLLABLE LIGHTING DEVICE FROM A PLURALITY OF LIGHTING DEVICES

(71) Applicant: SIGNIFY HOLDING B.V., Eindhoven (NL)

(72) Inventors: Tewe Hiepke Heemstra, Voldhoven (NL); Durandus Kornelius Dijken, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 17/048,700

(22) PCT Filed: Apr. 12, 2019

(86) PCT No.: PCT/EP2019/059444
§ 371 (c)(1),
(2) Date: Oct. 19, 2020

(87) PCT Pub. No.: WO2019/201779
PCT Pub. Date: Oct. 24, 2019

(65) Prior Publication Data
US 2021/0243872 A1 Aug. 5, 2021

(30) Foreign Application Priority Data
Apr. 19, 2018 (EP) ...................................... 18168106

(51) Int. Cl.
*H05B 47/10* (2020.01)
*H05B 47/19* (2020.01)
*H05B 47/125* (2020.01)

(52) U.S. Cl.
CPC ........... *H05B 47/19* (2020.01); *H05B 47/125* (2020.01)

(58) Field of Classification Search
CPC ...... H05B 47/10; H05B 47/19; H05B 47/125; H05B 47/165; H05B 45/20; H04M 1/724;
(Continued)

(56) References Cited

U.S. PATENT DOCUMENTS 8,314,569 B2 11/2012 Adamson et al.
9,345,106 B2 * 5/2016 Jonsson ................. H05B 47/19
(Continued)

FOREIGN PATENT DOCUMENTS

WO 2017102367 A1 6/2017

*Primary Examiner* — Haissa Philogene

(57) ABSTRACT

A method 600 of selecting a lighting device from a plurality of lighting devices 120, 122, 124 in a physical space 160 is disclosed. The method 600 comprises: obtaining 602 positions of the plurality of lighting devices 120, 122, 124 in the physical space 160, obtaining 604 a position of a user 130, receiving 606 a first user input from the user 130 indicative of a first direction originating from the position of the user 130, selecting 608 a first lighting device of the plurality of lighting devices 120, 122, 124 that is located in the first direction relative to the position of the user 130, providing 610 a notification to the user 130 that the first lighting device has been selected, receiving 612 a second user input from the user 130 indicative of a second direction originating from the position of the user 130, mapping 614 the second direction onto the selected first lighting device such that it originates from the position of the selected first lighting device, and selecting 616 a second lighting device of the plurality of lighting devices 120, 122, 124 that is located in the mapped second direction relative to the position of the selected first lighting device.

12 Claims, 5 Drawing Sheets

(58) Field of Classification Search
CPC ......... H04M 1/72412; H04M 1/72415; H04M 1/725; H04L 12/12; H04L 12/282; H04L 2012/2841; Y02B 20/40; Y02B 20/30
See application file for complete search history.

(56) References Cited

U.S. PATENT DOCUMENTS

| | | | |
|---|---|---|---|
| 9,491,834 B2 * | 11/2016 | Van De Sluis | H05B 47/19 |
| 9,538,602 B2 * | 1/2017 | Yagi | H05B 45/20 |
| 9,674,931 B1 * | 6/2017 | Chen | G06F 3/04847 |
| 9,900,091 B2 * | 2/2018 | Choi | G06F 21/445 |
| 9,955,545 B1 * | 4/2018 | Chang | H05B 47/16 |
| 9,997,070 B1 * | 6/2018 | Komanduri | H05B 47/195 |
| 10,142,554 B2 * | 11/2018 | Ryu | H05B 45/20 |
| 10,165,658 B2 * | 12/2018 | Yoo | H04M 1/72412 |
| 10,785,855 B2 * | 9/2020 | Feil | H04L 63/0428 |
| 2003/0107888 A1 | 6/2003 | Devlin et al. | |
| 2014/0225526 A1 | 8/2014 | Jonsson | |
| 2016/0088707 A1 | 3/2016 | Van De Sluis et al. | |
| 2016/0345407 A1 | 11/2016 | Nolan et al. | |
| 2017/0123515 A1 | 5/2017 | Ha et al. | |

* cited by examiner

600

METHOD OF SELECTING A CONTROLLABLE LIGHTING DEVICE FROM A PLURALITY OF LIGHTING DEVICES

CROSS-REFERENCE TO PRIOR APPLICATIONS

This application is the U.S. National Phase application under 35 U.S.C. § 371 of International Application No. PCT/EP2019/059444, filed on Apr. 12, 2019, which claims the benefit of European Patent Application No. 18168106.5, filed on Apr. 19, 2018. These applications are hereby incorporated by reference herein.

FIELD OF THE INVENTION

The invention relates to a method of selecting a controllable lighting device from a plurality of lighting devices in a physical space. The invention further relates to a computer program product for executing the method. The invention further relates to a system for selecting a controllable lighting device from a plurality of lighting devices in a physical space.

BACKGROUND

Home and office lighting control systems enable users to control lamps that are distributed throughout the space. A user can select a lighting device, for instance by selecting it on a user interface of a mobile device such as a mobile phone, and provide a user input to change the light output (e.g. intensity, color, direction, etc.) of the lighting device. Alternatively, a user may select and control a lighting device by providing a voice input to select it. A smart speaker or mobile device may detect the voice input and control the lighting device accordingly. A user may, for instance, say "turn the dining room lamps on", whereupon the smart speaker or mobile device may use natural language processing to identify the user's intentions and control the lamps in the dining room accordingly. In an alternative lamp selection and control system a user may provide a gesture, e.g. by pointing, to select a certain lighting device. The user may for instance select a lighting device by pointing with a dedicated device, such as a remote control device or a smartphone, to the lighting device. U.S. patent application 2014/225526 A1 discloses such a system. In this system, a user may select a lighting device by pointing a handheld controller to it. The position and the orientation of the handheld controller relative to the lighting devices determine which lighting device is selected. A problem that occurs when selecting such a lighting device is that, when the mapping of the position and/or orientation of the handheld controller relative to the lighting devices is off, a user has to point into a direction different from the direction in which the lighting device is located in order to select it. Thus, for the system of U.S. 2014/225526 A1 to function properly, the mapping of the position and/or orientation of the handheld controller relative to the lighting devices system should be correct and precise and accurate.

U.S. patent application 2016/0088707 A1 discloses an apparatus for lighting control. One or more lighting properties are controlled based on user manipulation of a mobile computing device. User gesture data from the mobile computing device may be used to adjust lighting properties of one or more LEDs. A mapping of LEDs to magnetic field strengths and/or directions may be utilized to determine the location of the mobile phone relative to one or more LEDs. A user may point a camera of the mobile computing device and control a device in the field of view of the camera. A positional sensor may be utilized to determine a distance that the phone has been moved and an indication of this distance provided by the user gesture data. Based on the indicated distance and a mapping of the LEDs, the lighting controller may activate additional LEDs to provide the light output that has a footprint extending out that distance.

International patent application WO 2017/102367 A1 discloses that a user may provide a first user input to select a first lighting device, and a second user input to subsequently select a second lighting device, where-upon a light effect is applied to both lighting devices.

SUMMARY OF THE INVENTION

It is an object of the present invention to provide a method and a system that enable a user to select a lighting device in a lighting system. It is a further object of the present invention to enable a user to correct an (automatic) selection of a lighting device. It is a further object of the present invention to provide a method and a system which enable a user to select a correct lighting device if the positional mapping between the user and the lighting devices is off.

According to a first aspect of the present invention, the object is achieved by a method of selecting a lighting device from a plurality of lighting devices in a physical space. The method comprises:
  obtaining positions of the plurality of lighting devices in the physical space,
  obtaining a position of a user,
  receiving a first user input from the user indicative of a first direction originating from the position of the user,
  selecting a first lighting device of the plurality of lighting devices that is located in the first direction relative to the position of the user,
  providing a notification to the user that the first lighting device has been selected,
  receiving a second user input from the user indicative of a second direction originating from the position of the user,
  mapping the second direction onto the selected first lighting device such that it originates from the position of the selected first lighting device, and
  selecting a second lighting device of the plurality of lighting devices that is located in the mapped second direction relative to the position of the selected first lighting device.

If the position of the user relative to the plurality of lighting devices is known, a first lighting device can be selected based on the first direction provided by the user. A user may, for instance, point in a direction of a lighting device, whereupon a first direction is derived from the user input. Subsequently, that (first) lighting device is selected based on the first direction relative to the position of the user. The user is notified that the first lighting device has been selected (e.g. by providing feedback to the user, for instance by blinking the selected lighting device, providing an auditory output, indicating the selection on a display, etc.), which enables the user to determine if the correct lighting device has been selected. If this is not the case, the user may provide a (corrective) second user input to select the desired (second) lighting device. The system of U.S. 2014/225526 A1 enables a user to select a subsequent lighting device by pointing towards that subsequent lighting device. This, however, has the disadvantage that, if the mapping between the user and the lighting devices is off, the user has to point into a direction different from the direction in which the subsequent lighting device is located. The inventors have realized that such a selection mechanism can be incomprehensible and have a negative effect on the user experience. To solve this problem, the method enables a user to provide a second user input that does not require the user to aim at the to-be-selected lighting device, but which enables the user to select a second lighting device relative to the first lighting device. The second user input has a second direction that is relative to the user (e.g. a rightward movement), which second direction is then mapped onto the lighting devices such that it originates from the position of the selected first lighting device. Thus, the second lighting device is selected relative to the first lighting device based on the second direction of the second user input. This is beneficial, because it enables a user to correct an (automatic) selection of a lighting device in a comprehensible and intuitive way, even if the mapping of the position of the user relative to the lighting devices is incorrect.

The second user input may be further indicative of a distance, and the step selecting the second lighting device may be further based on the distance. The second user input may for instance have an intensity value, wherein the intensity value is indicative of the distance. For example, a fast gesture may be indicative of a further distance compared to a slow gesture. In another example, wherein the second user input is a voice command, the voice command may be descriptive and indicative of the distance. This is beneficial in embodiments wherein the lighting system comprises more than two lighting devices, because it enables the user to specify which second lighting device is to be selected from the plurality of lighting devices.

The step of providing a notification to the user may comprise changing the light output of the first lighting device. This provides direct feedback to the user when the first lighting device has been selected. Alternative ways of notification include, for example, an indication of the selection on a display of a user interface, an auditory feedback indicative of the selection of a certain lighting device, etc.

The method may further comprise the step of providing a second notification to the user that the second lighting device has been selected. This provides feedback to the user when the second lighting device has been selected. The second notification may comprise changing the light output of the second lighting device. Alternative ways of notification include, for example, an indication of the selection on a display of a user interface, an auditory feedback indicative of the selection of a certain lighting device, etc.

The method may further comprise the step of deselecting the first lighting device. This step may occur after/when the second lighting device has been selected. This is beneficial when the user's intention is to select only the second lighting device.

The method may further comprise the steps of receiving a control command from the user and controlling or configuring the second lighting device based on the control command. The user control command may be provided via any type of user interface. Examples of user interfaces include gesture-based user interfaces, voice-controlled user interfaces, touch screens, etc. This is beneficial, because it enables a user to first select a second lighting device and subsequently control (e.g. change the light output of the second lighting device) and/or configure (e.g. change configuration settings) the second lighting device in the lighting system.

Alternatively, the method may further comprise the steps of receiving a control command from the user and controlling or configuring the first and the second lighting device based on the control command. When the first lighting device is not deselected upon selecting the second lighting device, the user may control and/or configure both the first and the second lighting device. This is beneficial, because it enables a user to first select the first and the second lighting device and subsequently control (e.g. change the light output of the second lighting device) and/or configure (e.g. change configuration settings) both.

The first and/or the second user input may be a voice input. The method may comprise determining a direction of the voice command based on audio signals received at one or more microphones. Additionally, the position and/or orientation of the user may be determined based on the audio signals. Differences in time of flight or sound intensity received at multiple microphones may be used to determine the direction of the voice command. The first and/or second direction may be derived from the voice command by using natural language processing. A user may, for instance, provide a first voice input to select the first lighting device. An example of such a voice input is "select that lamp", whereupon the direction of that voice input may be determined based on audio signals received at the one or more microphones. Based on the direction and based on the position of the user and the plurality of lighting devices, the first lighting device may be selected. Additionally or alternatively, the user may, for instance, provide a second voice input to select the second lighting device (relative to the first lighting device). An example of such a second voice input is "no, right", whereupon the second direction may be derived from the second user input (i.e. right of the first lighting device) and a lighting device on the right of the first lighting device may be selected.

The first and/or the second user input may be a gesture input. This is beneficial, because it enables a user to point at a first lighting device, and/or provide a gesture movement (e.g. a flicking movement) to select the second lighting device.

The step of receiving the first (gesture) user input and/or the step of receiving the second (gesture) input may comprise capturing one or more images of the user, analyzing the one or more images, and retrieving the gesture input from the one or more images. The one or more images may be captured by an image capturing device such as a (3D depth) camera, and known image processing techniques may be used to derive the gesture from the one or more images. The image capturing device may be comprised in a (portable) user device such as a pair of smartglasses configured to detect arm/hand/finger motions of the user wearing the pair of smartglasses. Alternatively, the image capturing device may be a remote device, for instance a camera located in the physical space, for detecting the gesture(s). This may be beneficial, because the user is free from dedicated devices for providing the gesture input. The camera may be configured to detect visible light and/or (near) infrared light, and/or the 'camera' may be configured to operate with radar wavelengths and aperture synthesis and/or radar signature detection.

The step of receiving the first (gesture) user input and/or the step of receiving the second (gesture) input may comprise detecting, by a motion sensor comprised in a portable user device, a movement of the user portable device, and retrieving the gesture input from the movement of the portable user device. The motion sensor (e.g. an accelerometer, a gyroscope, a magnetometer, etc.) may be comprised in the portable user device. The portable user device may for instance be a remote control device, a smartphone, a lighting control wand, a smart watch, a smart finger ring, etc. This enables a user to, for instance, point with the portable user device to a (first) lighting device to select it, and/or flick/move the portable lighting device in a direction in order to select a second lighting device. This provides an intuitive, comprehensible way of selecting a lighting device from a plurality of lighting devices.

The second user input may, for example, be a flicking movement of the portable device, and the method may further comprise deriving the direction from the flicking movement. A user may, for instance, flick the portable user device (i.e. quickly move in a certain direction) to the right in order to select a (second) lighting device to the right of the first lighting device.

According to a second aspect of the present invention, the object is achieved by a computer program product for a computing device, the computer program product comprising computer program code to perform any one of the above-mentioned method when the computer program product is run on a processing unit of the computing device.

According to a third aspect of the present invention, the object is achieved by a system for selecting a lighting device from a plurality of lighting devices in a physical space.

The system comprises:

a receiver configured to obtain a position of a user, a user interface configured to receive a first user input from the user indicative of a first direction originating from the position of the user, and to receive a second user input from the user indicative of a second direction originating from the position of the user, a processor configured to:

obtain positions of the plurality of lighting devices in the physical space, select a first lighting device of the plurality of lighting devices that is located in the first direction relative to the position of the user, and provide a notification to the user that the first lighting device has been selected, wherein the processor is further configured to: map the second direction onto the selected first lighting device such that it originates from the position of the selected first lighting device, and select a second lighting device of the plurality of lighting devices that is located in the mapped second direction relative to the position of the selected first lighting device.

It should be understood that the computer program product and the system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
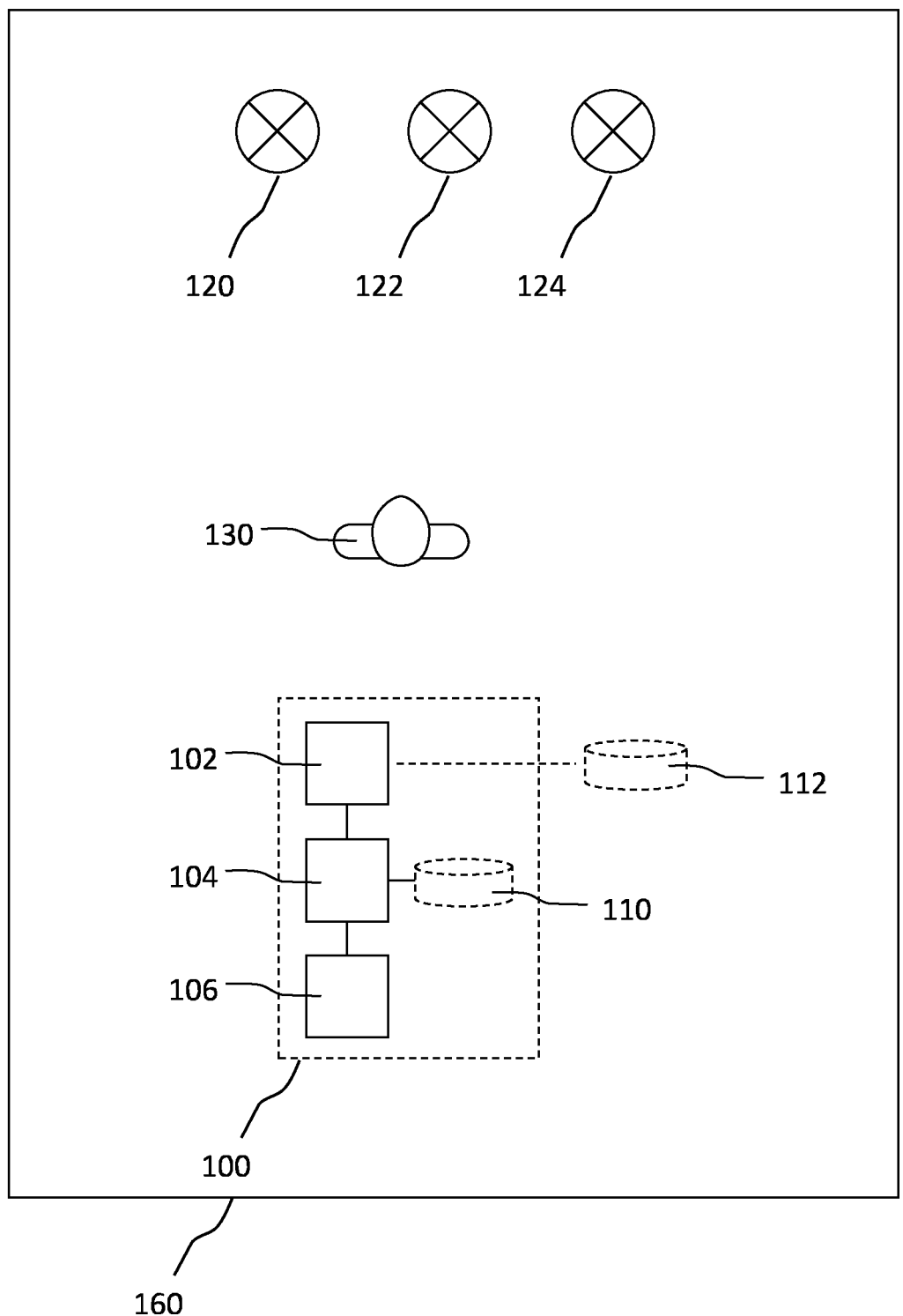
FIG. 1 shows schematically an embodiment of a system for selecting a controllable lighting device from a plurality of lighting devices.

FIG. 1 shows a system 100 for selecting a controllable lighting device from a plurality of lighting devices 120, 122, 124 in a physical space 160. The system 100 comprises a receiver 102 configured to obtain a position of a user 130 relative to the plurality of lighting devices 120, 122, 124. The system 100 further comprises a user interface 106 configured to receive a first user input from the user 130 indicative of a first direction originating from the position of the user, and to receive a second user input from the user 130 indicative of a second direction originating from the position of the user. The system further comprises a processor 104 (e.g. a microchip, a microprocessor 104, circuitry, etc.) configured to obtain positions of the plurality of lighting devices 120, 122, 124 located in the physical space 160. The processor 104, coupled to the receiver and the user interface 106, is further configured to select a first lighting device of the plurality of lighting devices 120, 122, 124 that is located substantially in the first direction relative to the position of the user 130, and provide a notification to the user 120, 122, 124 that the first lighting device has been selected. The processor 104 is further configured to map the second direction onto the selected first lighting device such that it originates from the position of the selected first lighting device, and select a second lighting device of the plurality of lighting devices 120, 122, 124 that is located substantially in the mapped second direction relative to the position of the selected first lighting device.

The processor 104 may for example calculate vectors for the directions. The processor 104 may, for instance, create a first vector having the first direction and a first origin at the user 130, and select the first lighting device (e.g. lighting device 120) of the plurality of lighting devices 120, 122, 124 that is located in the first direction relative to the first origin. The processor 104 may further create a second vector having the second direction and a second origin at the user 130, translate/move the second vector to the positions of the plurality of lighting devices 120, 122, 124 to create a third vector having the second direction and a third origin at the selected first lighting device, and select a second lighting device (e.g. lighting device 122) of the plurality of lighting devices 120, 122, 124 that is located in the second direction relative to the third origin.

The system 100 may be comprised in a single device, for instance a smartphone or a central (home/office) control system. In an exemplary embodiment, the user interface 106 may, for example, be comprised in a smartphone and comprise a motion sensor for detecting gestures made with the smartphone by the user 130, or for example a microphone for detecting voice commands provided by the user 130. The processor 104 and the receiver 102 may be comprised in the smartphone as well. Alternatively, the components of the system may be comprised in different subsystems which may be located in the space 160 or remotely, e.g. in the 'cloud', accessible via a network. For instance, the user interface may be a camera system (which may be located in the space 160, or which may be comprised in a pair of smartglasses worn by the user 130) configured to detect gestures provided by the user 130, and the camera may be connected to a central control system configured to receive inputs from the camera system. In another example the user interface may be a motion sensor comprised in a portable user device (e.g. a smartphone, a lighting control wand, etc.) configured to detect gestures provided by the user 130, and the camera may be connected to a central control system configured to receive inputs from the camera system.

The receiver 102 is configured to obtain a position of the user 130. The receiver 102 may receive the current position of the user 130 from, for example, an (indoor) positioning system. The positioning system may comprise a database 112 for storing the positions of the lighting devices 120, 122, 124 and/or the position of the user 130. The positioning system may continuously update the positions of the lighting devices 120, 122, 124 and/or the position of the user 130. The (indoor) positioning system may be GPS-based, beacon-based, coded light-based, etc. Such positioning systems are known in the art and will therefore not be further explained. The receiver 102 may be further configured to obtain/receive the positions of the lighting devices 120, 122, 124 in a similar way. The positions of the lighting devices 120, 122, 124 and the position of the user 130 may, for instance, be sets of 2D/3D coordinates in the space 160.

The processor 104 is configured to obtain the positions of the plurality of lighting devices 120, 122, 124. The positions of the plurality of lighting devices 120, 122, 124 may be relative to the physical space 160. The processor 104 may for example receive the positions via the receiver 102 or, for example, the processor 104 may receive the positions from a database 110, which may be comprised in the system 100. The processor 104 is further configured to obtain the position of the user 130 from the receiver. By having access to the position of the user 130 and the positions of the lighting devices 120, 122, 124, the processor 104 is able to determine the position of the user 130 relative to the lighting devices 120, 122, 124, based thereon the processor 104 may calculate which lighting device is located in the first direction as indicated by the first user input.

The user interface 106 is configured to receive the first user input indicative of the first direction and the second user input indicative of the second direction from the user 130. The user interface 106 may be any type of user interface 106 (e.g. a gesture-based user interface, a voice-based user interface, a gaze-based user interface, a touch-based user interface, a motion-based user interface, etc.) for receiving user input that is indicative of a direction. Detailed examples of different types of user interfaces will be provided below.

Figure 2A:
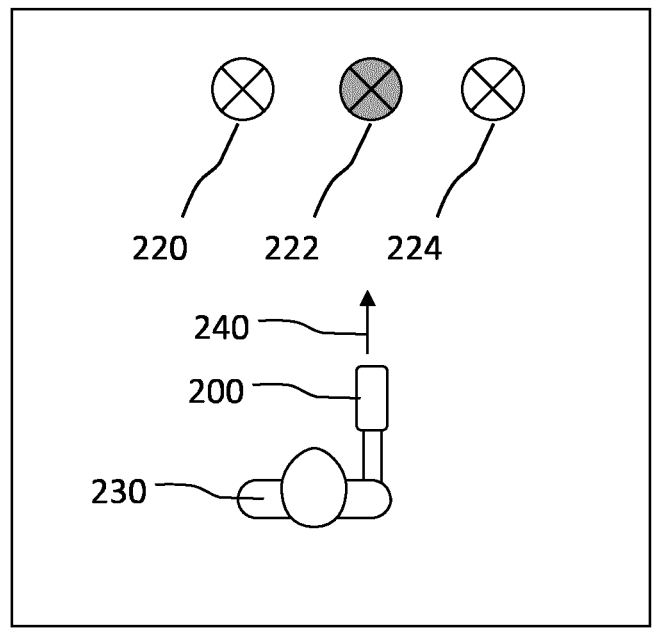
FIGS. 2a and 2b show schematically top views of a space wherein a user first selects a first lighting device and subsequently selects a second lighting device.

The processor 104 is further configured to derive the first direction from the first user input. A user 130 may, for example, point with a mobile device in the direction of a lighting device to provide the first user input. This pointing has a direction, and the processor 104 may derive that direction. Since the processor 104 has access to the position of the user 130, the processor 104 may calculate the first direction with an origin at the position of the user. Since the processor 104 further has access to the positions of the lighting devices 120, 122, 124, the processor 104 may calculate which lighting device is located in the first direction relative to the user's position. If no lighting device is located in the first direction, the processor 104 may determine which lighting device is located in (closest) proximity of the first direction, or which lighting device is located within a threshold distance of the first direction. The processor 104 then selects the first lighting device that is located in the first direction. An example is illustrated in FIG. 2a, wherein a user 230 points a mobile device 200 in direction 240, whereupon the first lighting device 222 is selected. The processor 104 may notify the user that first lighting device 222 has been selected, for instance by communicating a control command to the first lighting device 222 to blink the light/switch it on.

Figure 2B:
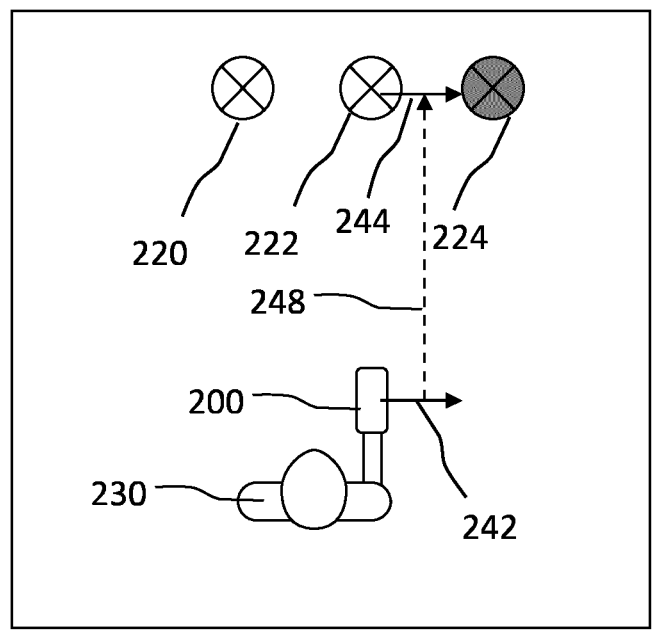

The processor 104 is further configured to derive the second direction from the second user input. The second user input may, for example, be a sideward movement of a mobile device. This sideward movement has a second direction (e.g. to the right), and the processor 104 may derive that second direction from the movement. The processor 104 may set the origin of the second direction equal to position of the user 130, and subsequently move/translate the second direction to the positions of the plurality of lighting devices 120, 122, 124 such that the second direction has an origin located at the position of the selected first lighting device. Based on this translation, the processor 104 may select a second lighting device of the plurality of lighting devices that is located in the second direction relative to the selected first lighting device. If no lighting device is located in the second direction, the processor 104 may determine which lighting device is located in (closest) proximity of the second direction, or which lighting device is located within a threshold distance of the second direction. An example is illustrated in FIG. 2b, which illustrates a selection of a second lighting device 224 after the first lighting device 222 has been selected (see FIG. 2a). In FIG. 2b, the user 230 moves the mobile device 200 in the (second) direction 242. The processor 104 (not shown in FIGS. 2a and 2b) may calculate the second direction 242 and set the second origin of the second direction equal to the user's 230 position, and map 248 the second direction onto the first lighting device 222 such that the second direction has an origin located at the position of the selected first lighting device 222. The processor 104 may then select the second lighting device 224, which is located in the second direction relative to the selected first lighting device 222, based on the mapped second direction 244. Alternatively, instead of a sideward movement, the mapping can be based on a rotation, or a combination of rotation and sideward movement, or on tapping against one of the sides of the device.

FIGS. 2a and 2b illustrate a space wherein a user 230 first selects a first lighting device 222 and subsequently selects a second lighting device 224. In this example, the user 230 is carrying a portable user device 200, such as a smartphone, for selecting (and, optionally, controlling) the plurality of lighting devices 220, 222, 224. The portable user device 200 may comprise one or more motion and/or orientation sensors (e.g. an accelerometer, a gyroscope, a magnetometer, etc.) for detecting the first and/or the second user input. The user 230 may provide a pointing gesture towards a lighting device, and the pointing direction (i.e. the orientation of the portable device 200) may be detected by an orientation sensor, such as a gyroscope, comprised in the portable device 200. Based on the pointing direction, the position of the user 230 and the positions of the lighting devices 220, 222, 224, the first lighting device 222 may be selected by the processor 104. If the user desires to select another lighting device (and not lighting device 222), the user may provide a second gesture to select the second (correct) lighting device 224. The second (corrective) gesture to select the second lighting device 224 may, for instance, be a rightward flicking motion with the portable device 200, which may be detected by a motion sensor, such as an accelerometer, comprised in the portable device 200. Another example of a second gesture may be a second pointing gesture, where the user 230 may rotate the portable device 200 (90 degrees) clockwise to select the second lighting device 224. This second pointing gesture may be detected by an orientation sensor.

Figure 3:
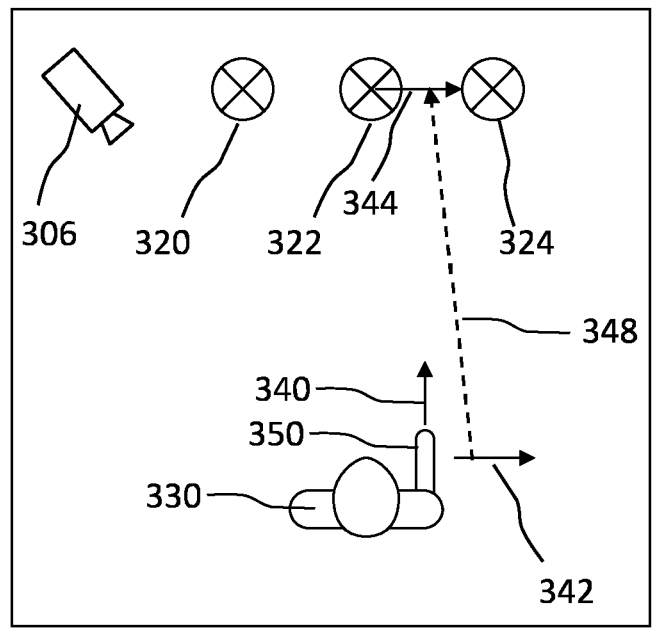
FIG. 3 shows schematically an embodiment of a system for selecting a controllable lighting device by means of a gesture input.

FIG. 3 shows another example of a system for selecting a first lighting device 322 and subsequently a second lighting device 324 by means of a gesture input. In this example, a camera system 306 which comprises one or more (depth) cameras is used to detect pointing and movement gestures of a user 330. Such camera systems are known in the art and will therefore not be discussed in detail. The user may, for instance, point in a direction 340 to select a lighting device. The processor 104 may determine the direction 340 of the first user input based on the pointing gesture 350, the position of the user and the orientation of the user 430. The processor 104 determine that the user 330 is pointing at lighting device 322. The processor 104 may then select lighting device 322 and provide a notification to the user 330 that lighting device 322 has been selected. The user 330 may have intended to point at lighting device 324, and may therefore provide a second user input to correct the selection. The corrective gesture may be a sideward flicking or waving motion of the user's arm or hand, which may be detected by the camera system 306. The processor 104 may derive the second direction 342 from the motion and map 348 the second direction 342 onto the first lighting device 322 and select the second lighting device 324 based on the mapped second direction 344.

The gesture input may for example be a gaze direction or eye movement of the user. A camera system, which may be located remotely 306 from the user or be located on or near the user, for instance in a pair of smartglasses, may be configured to detect the gaze/looking direction of a user. This enables the user to provide the first input by looking at a certain lighting device, and subsequently select a (correct) second lighting device by providing a second (eye movement) user input.

Figure 4:
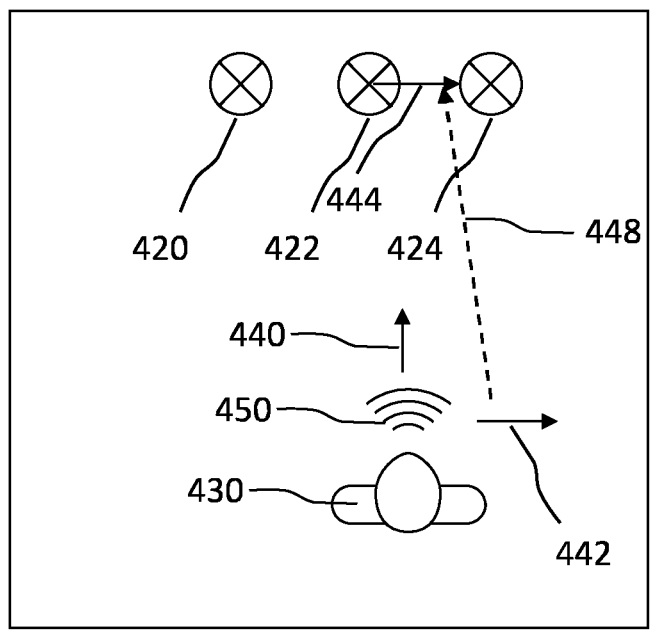
FIG. 4 shows schematically an embodiment of a system for selecting a controllable lighting device by means of a voice input.

FIG. 4 shows another example of a system for selecting a first lighting device 422 and subsequently a second lighting device 424 by means of a voice input 450. In this example, a voice recognition system which comprises one or more microphones is used to detect voice input 450 of a user 430. Voice recognition systems that use natural language processing and automatic speech recognition are known, and will therefore not be discussed in detail. The user 430 may, for instance, provide a voice input 450 to select a lighting device in front of the user 430. The user 430 may, for instance, say "turn on the light". The processor 104 may determine the direction 440 of the first user input based on the voice input, the position of the user and the orientation of the user 430 (which both may also be inferred from the voice command). The processor 104 may determine that the user is facing lighting device 422. The processor 104 may then select that lighting device 422 and provide a notification to the user 430 that lighting device 422 has been selected. The user 430 may have had the intention to turn another lighting device on, namely lighting device 424, and may therefore provide a second voice input to correct the selection. The user may, for example, say "no, turn on the lamp to the right". The processor 104 may derive the second direction 442 from the second voice input and map 448 the second direction 442 onto the selected first lighting device 422 and select the second lighting device 424 based on the mapped second direction 444.

Figure 5:
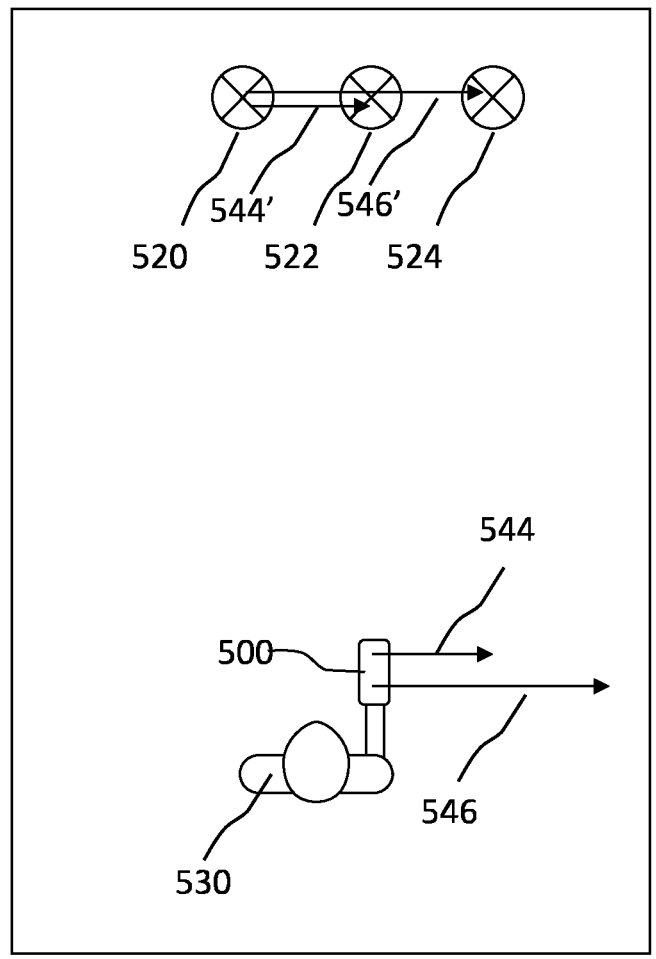
FIG. 5 shows schematically an embodiment of a system for selecting a controllable lighting device, wherein a user selects a lighting device based on a user input that is indicative of a distance.

The processor 104 may be further configured to derive a distance from the second user input. The processor 104 may be further configured to select the second lighting device based on the distance. The second user input may be indicative of the distance. For instance, the second user input may have a certain intensity value indicative of the distance. For example, a slow gesture may have a smaller intensity value compared to a faster gesture, and a gesture covering a small distance may have smaller intensity value compared to a gesture covering a larger distance. In another example, a voice input may be indicative of the distance (e.g. "select the lighting device furthest on the right" or "no, the lamp far more to the right"). This is further illustrated in FIG. 5., which shows a system for selecting a lighting device from a plurality of lighting devices 520, 522, 524. In this example, the processor 104 may have selected lighting device 520, and provided a notification to the user 530 that lighting device 520 has been selected. The user 530 may provide a second user input to select a second lighting device by providing a gesture with a portable device 500. FIG. 5 illustrates a first example of a second user input 544 with a corresponding direction and distance, and a second example of a second user input 546 with a corresponding direction and distance. If, for instance, lighting device 520 has been selected by the processor 104, while the user 530 intended to select lighting device 522, the user 530 may provide a second user input indicative of a short distance 544. The processor 104 may derive the direction and the (short) distance from the user input, and map the second direction and its distance 544 onto the selected first lighting device 520. The processor 104 may select lighting device 522 based on the mapped second direction 544'. In another example, if, for instance, lighting device 520 has been selected by the processor 104, while the user 530 intended to select lighting device 524, the user 530 may provide a second user input indicative of a longer distance 546. The processor 104 may derive the direction and the (longer) distance from the user input, and map the second direction and its distance 546 onto the selected first lighting device 520. The processor 104 may select lighting device 524 based on the mapped second direction 546'.

In the examples in FIGS. 1-5, the lighting devices are positioned in a linear, one-dimensional configuration. It should be understood that the configuration of the lighting devices may be two or three dimensional. In such a multi-dimensional configuration, the first and/or second user input may also be multidimensional. The user may, for instance, provide a three dimensional pointing gesture with a three dimensional direction as the second user input. The processor 104 may map the three dimensional direction onto the selected first lighting device such that it originates from the position of the selected first lighting device, and select a second lighting device based thereon.

The lighting devices 120, 122, 124 may be any type of lighting devices arranged for receiving lighting control commands. Each lighting device 120, 122, 124 may comprise a receiver for receiving the control commands, or the plurality of lighting devices 120, 122, 124 may comprise one receiver for receiving the control commands. The control commands may, for instance, be received via a (wireless) network, such as a Wi-Fi, Bluetooth or ZigBee network. The lighting devices may be arranged for providing general lighting, task lighting, ambient lighting, atmosphere lighting, accent lighting, indoor lighting, outdoor lighting, (swimming) pool lighting, aquarium lighting etc. The lighting devices may be installed in a luminaire, in multiple luminaires, as an array of lighting devices (such as an LED wall), etc. Alternatively, the lighting devices may be portable lighting devices. The lighting devices may be battery operated. The lighting devices may be repositionable, and the positional mapping of the lighting devices may be continuously determined.

The processor 104 may be further configured to notify the user 130 that the first lighting device has been selected by controlling/changing the light output of the selected first lighting device. The processor 104 may, for example, generate a lighting control command and communicate the lighting control command via a (wireless) network to the first lighting device. The first lighting device may receive the lighting control command and change its light output based thereon. Additionally or alternatively, the processor 104 may be configured to provide the notification in a different way, for instance by providing audio output to indicate that a certain first lighting device has been selected (e.g. by providing an output "living room lamp 1 has been selected"), or by providing an indication on a display of a user interface that a certain first lighting device has been selected (e.g. by providing an icon or text on a display that indicate the selection).

The processor 104 may be further configured to notify the user 130 that the second lighting device has been selected. The processor 104 may be configured to control/change the light output of the selected second lighting device. The processor 104 may, for example, generate a lighting control command and communicate the lighting control command via a (wireless) network to the second lighting device. The second lighting device may receive the lighting control command and change its light output based thereon. Additionally or alternatively, the processor 104 may be configured to provide the notification in a different way, for instance by providing audio output to indicate that a certain second lighting device has been selected (e.g. by providing an output "living room lamp 2 has been selected"), or by providing an indication on a display of a user interface that a certain second lighting device has been selected (e.g. by providing an icon or text on a display that indicate the selection).

Upon selection of the second device, the processor 104 may deselect the first lighting device.

The processor 104 may be further configured to control the first and/or the second lighting device. The processor 104 may receive a control command from the user (for instance via the user interface 106, or from a secondary user interface), and control the first and/or the second lighting device based on the control command. The control command may, for instance, be a light setting selection on a touch display (e.g. a selection of a certain light scene for the selected lighting device(s)), be a voice command (e.g. "set the light to yellow"), a gesture (e.g. an upward/downward movement of a user's arm to change the intensity of the light output), etc.

The processor 104 may be further configured to configure the first and/or the second lighting device. The processor 104 may receive a control command from the user (for instance via the user interface 106, or from a secondary user interface), and control the first and/or the second lighting device based on the control command. The control command may, for instance, be a change of a configuration setting of the selected lighting device(s). The user may for instance, set a default light setting for the selected lighting device(s), change the identifier/address/name of the selected lighting device(s), link the selected lighting device(s) to a certain sensor connected to the lighting system comprising the selected lighting device(s), etc.

Figure 6:
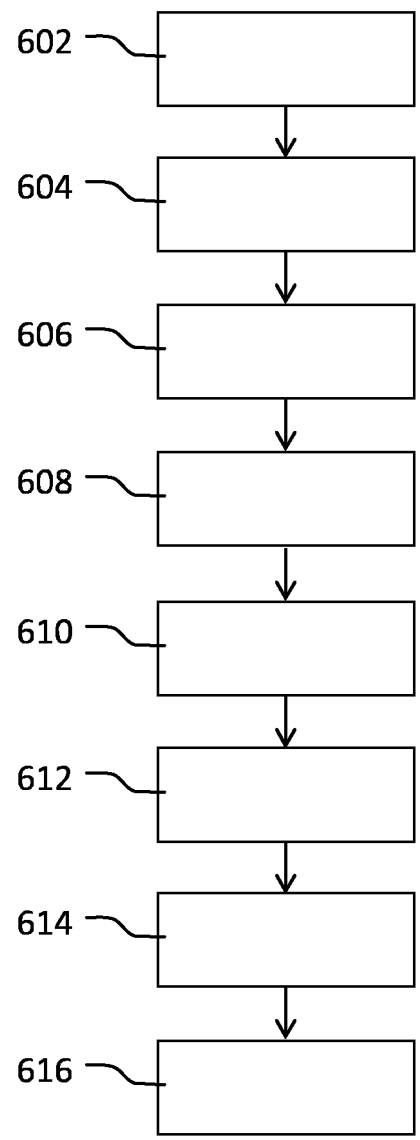
FIG. 6 shows schematically a method of selecting a controllable lighting device from a plurality of lighting devices in a physical space.

FIG. 6 shows schematically a method 600 of selecting a controllable lighting device from a plurality of lighting devices in a physical space. The method 600 comprises the steps of:

obtaining 602 positions of the plurality of lighting devices in the physical space, obtaining 604 a position of a user, receiving 606 a first user input from the user indicative of a first direction originating from the position of the user, selecting 608 a first lighting device of the plurality of lighting devices that is located in the first direction relative to the position of the user, providing 610 a notification to the user that the first lighting device has been selected, receiving 612 a second user input from the user indicative of a second direction originating from the position of the user, mapping 614 the second direction onto the selected first lighting device such that it originates from the position of the selected first lighting device, and selecting 616 a second lighting device of the plurality of lighting devices that is located in the mapped second direction relative to the position of the selected first lighting device.

The method 600 may be executed by computer program code of a computer program product when the computer program product is run on a processing unit of a computing device, such as the processor 104 of the system 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of correcting a selection of a lighting device from a plurality of lighting devices in a physical space, the method comprising:
   obtaining positions of the plurality of lighting devices in the physical space,
   obtaining a position of a user,
   receiving a first user input from the user indicative of a first direction originating from the position of the user,
   selecting a first lighting device of the plurality of lighting devices that is located in the first direction relative to the position of the user,
   providing a notification to the user that the first lighting device has been selected,
   receiving a second user input from the user indicative of a second direction originating from the position of the user,
   mapping the second direction onto the selected first lighting device such that it originates from the position of the selected first lighting device, and
   selecting a second lighting device of the plurality of lighting devices that is located in the mapped second direction relative to the position of the selected first lighting device, and deselecting the first lighting device to correct the selection of the first lighting device.

2. The method of claim 1, wherein the second user input is further indicative of a distance, and wherein the step of selecting the second lighting device is further based on the distance.

3. The method of claim 1, wherein the step of providing a notification to the user comprises changing the light output of the first lighting device.

4. The method of claim 1, further comprising:
   providing a second notification to the user that the second lighting device has been selected.

5. The method of claim 1, further comprising:
   receiving a control command from the user,
   controlling or configuring the second lighting device based on the control command.

6. The method of claim 1, wherein the first and/or the second user input is a voice input.

7. The method of claim 1, wherein the first and/or the second user input is a gesture input.

8. The method of claim 7, wherein the step of receiving the first user input and/or the step of receiving the second user input further comprises:
   capturing one or more images of the user,
   analyzing the one or more images, and
   retrieving the gesture input from the one or more images.

9. The method of claim 7, wherein the step of receiving the first user input and/or the step of receiving the second user input further comprises:
   detecting, by a motion sensor comprised in a portable user device, a movement of the portable user device, and
   retrieving the gesture input from the movement of the portable user device.

10. The method of claim 9, wherein the second user input is a flicking movement of the portable user device.

11. A computer program product for a computing device, the computer program product comprising computer program code to perform the method of claim 1 when the computer program product is run on a processing unit of the computing device.

12. A system for correcting a selection of a lighting device from a plurality of lighting devices in a physical space, the system comprising:
   a receiver configured to obtain a position of a user,
   a user interface configured to receive a first user input from the user indicative of a first direction originating from the position of the user, and to receive a second user input from the user indicative of a second direction originating from the position of the user,
   a processor configured to:
   obtain positions of the plurality of lighting devices in the physical space, select a first lighting device of the plurality of lighting devices that is located in the first direction relative to the position of the user, and provide a notification to the user that the first lighting device has been selected,
   wherein the processor is further configured to: map the second direction onto the selected first lighting device such that it originates from the position of the selected first lighting device, and select a second lighting device of the plurality of lighting devices that is located in the mapped second direction relative to the position of the selected first lighting device, and deselect the first lighting device to correct the selection of the first lighting device.

* * * * *